(12) United States Patent
Katti et al.

(10) Patent No.: US 7,310,337 B2
(45) Date of Patent: Dec. 18, 2007

(54) PACKET HEADER ALIGNMENT

(75) Inventors: Gururaj M. Katti, Karnataka (IN); Sukhbinder Takhar Singh, Karnataka (IN); Raju Kvk, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 1068 days.

(21) Appl. No.: 10/334,461

(22) Filed: Dec. 31, 2002

(65) Prior Publication Data

US 2004/0125750 A1    Jul. 1, 2004

(51) Int. Cl.
*H04L 12/56*    (2006.01)
*H04J 3/00*    (2006.01)
*G06F 12/00*    (2006.01)

(52) U.S. Cl. .................. 370/392; 370/474; 370/476; 711/201

(58) Field of Classification Search ............... 370/389, 370/392, 474–476, 471; 711/200–203
See application file for complete search history.

(56) References Cited

U.S. PATENT DOCUMENTS

| | | | | |
|---|---|---|---|---|
| 5,651,002 A | * | 7/1997 | Van Seters et al. | 370/392 |
| 6,804,240 B1 | * | 10/2004 | Shirakawa et al. | 370/392 |
| 7,039,054 B2 | * | 5/2006 | Narad et al. | 370/392 |
| 2003/0193949 A1 | * | 10/2003 | Kojima et al. | 370/392 |

* cited by examiner

*Primary Examiner*—Chi Pham
*Assistant Examiner*—Tri H. Phan
(74) *Attorney, Agent, or Firm*—Buckley, Maschoff & Talwalkar LLC

(57) ABSTRACT

According to some embodiments, a network layer header of a network packet is received, metadata associated with the network packet is received, a header offset associated with the network packet is determined based on the metadata, and the network layer header is stored in an aligned cache based on the header offset.

4 Claims, 9 Drawing Sheets

| DRAM Address | byte 0 | byte 1 | byte 2 | byte 3 | byte 4 | byte 5 | byte 6 | byte 7 |
|---|---|---|---|---|---|---|---|---|
| 0x2000 | PPP | PPP | IP | IP | IP | IP | IP | IP |
| 0x2008 | IP | IP | IP | IP | IP | IP | IP | IP |
| 0x2010 | IP | IP | Data | Data | IP | IP | IP | IP |
| 0x2018 | Data | Data | Data | Data | Data | Data | Data | Data |
| 0x2020 | Data | Data | Data | Data | Data | Data | Data | Data |
| 0x2028 | Data | Data | Data | Data | Data | Data | Data | Data |
| 0x2030 | Data | Data | Data | Data | Data | Data | Data | Data |
| 0x2038 | Data | Data | Data | Data | Data | Data | Data | Data |

PRIOR ART

FIG. 1

| DRAM Address | byte 0 | byte 1 | byte 2 | byte 3 | byte 4 | byte 5 | byte 6 | byte 7 |
|---|---|---|---|---|---|---|---|---|
| 0x2000 | ETH | ETH | ETH | ETH | ETH | ETH | ETH | ETH |
| 0x2008 | ETH | ETH | ETH | ETH | ETH | ETH | ETH | ETH |
| 0x2010 | IP | IP | IP | IP | IP | IP | IP | IP |
| 0x2018 | IP | IP | IP | IP | IP | IP | IP | IP |
| 0x2020 | IP | IP | IP | IP | IP | IP | IP | IP |
| 0x2028 | Data | Data | Data | Data | Data | Data | Data | Data |
| 0x2030 | Data | Data | Data | Data | Data | Data | Data | Data |
| 0x2038 | Data | Data | Data | Data | Data | Data | Data | Data |

PRIOR ART

FIG. 2

PACKET HEADER ALIGNMENT

BACKGROUND

Conventional communication networks allow network devices to exchange packets of information, or network packets, with one another. For example, one personal computer connected to a network may transmit packets to another personal computer that is also connected to the network. Certain types of network devices are used to facilitate the exchange of network packets between other network devices. A network switch or router may receive streams of network packets from other network devices, such as personal computers and handheld devices, process the packets, and forward the packets to appropriate other network devices, including other network switches or routers. The network packets may be received and forwarded by several network devices until they reach an appropriate destination.

A network packet may include actual data intended for transmission and data appended thereto for network purposes. The former type of data will be referred to herein as "data" and the latter type will be referred to as "header information". Such header information may include, among other information, a source address, a destination address, a source port and a destination port. A network packet may be processed and forwarded based on its header information.

According to some environments, distinct portions of header information are associated with each of the link, network, transport and application layers of a seven-layer ISO OSI protocol stack. In this regard, header information for each layer is successively appended to a packet's data before it is transmitted. Each successively-appended portion of header information may be considered a separate header. Header information of a network packet may therefore be seen to include a link layer header, a network layer header, etc.

FIG. 1 illustrates a conventional network packet as stored in a memory upon receipt by a network device. The FIG. 1 packet includes a link layer header and a network layer header appended to the packet's data. As shown, the link layer is a point-to-point protocol (PPP) layer and the network layer is an Internet Protocol (IP) layer. The represented packet is therefore a "IP over PPP" packet. FIG. 2 also illustrates a received and stored network packet. The FIG. 2 packet is an "IP over Ethernet" packet. As such, the associated data link layer is IP and the associated network layer is Ethernet.

According to some systems, the minimum burst size for accessing the FIG. 1 and FIG. 2 memory is eight bytes. Consequently, the memory is accessible on a quad word (64 bit) boundary. Neither the FIG. 1 nor the FIG. 2 network layer headers are aligned with a quad word boundary. Rather, the FIG. 1 network layer header is offset from a quad word boundary (0x2000) by two bytes and the FIG. 2 network layer is offset from a quad word boundary (0x2008) by six bytes.

A conventional system may include several processing units for processing a network layer header of a received packet. However, each of these units must somehow extract and align the network layer header with an accessible memory boundary before processing the network layer header. Each unit must also unalign the header after completion of its processing.

BRIEF DESCRIPTION OF THE DRAWINGS

FIG. 1 is an illustration of an IP over PPP network packet as stored in a memory.

FIG. 2 is an illustration of an IP over Ethernet network packet as stored in a memory.

DETAILED DESCRIPTION

Figure 3:
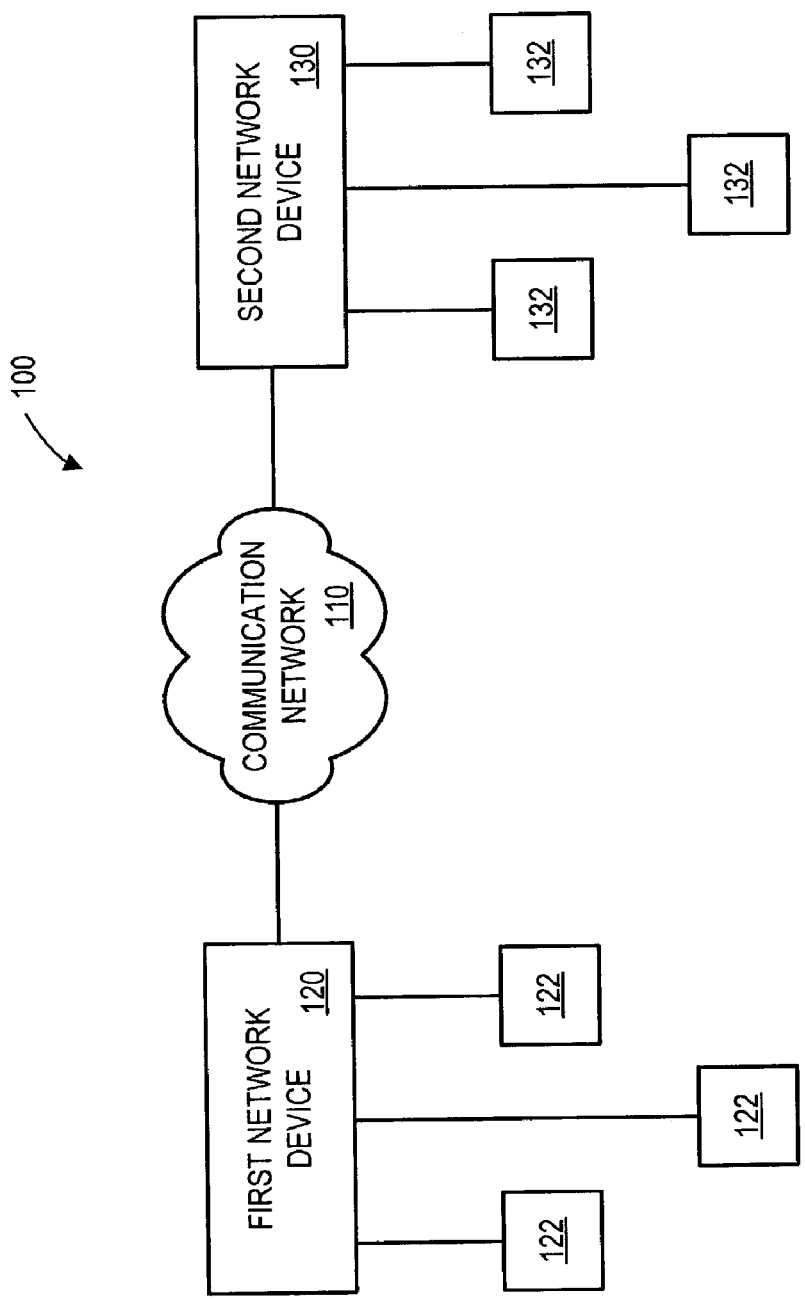
FIG. 3 is a block diagram of a network according to some embodiments.

FIG. 3 is a block diagram of communication system 100. Communication system 100 includes communication network 110, which is in communication with first network device 120 and second network device 130. In particular, first network device 120 may exchange information with second network device 130 via communication network 110. Network devices 120 and 130 may comprise, for example, network switches or routers, such a device incorporating one or more IXP2400 network processors available from Intel®.

Communication network 110 may comprise one or more network types, including but not limited to a Local Area Network (LAN), a Metropolitan Area Network (MAN), a Wide Area Network (WAN), a Fast Ethernet network, a wireless network, a fiber network, and/or an Internet Protocol (IP) network, such as the Internet, an intranet, or an extranet. Moreover, communication network 110 may comprise one or more of any readable medium for transferring data, including coaxial cable, twisted-pair wires, fiber-optics, RF, infrared and the like. Communication network 110 may include any number of unshown network devices (e.g., intermediate switches and routers).

As illustrated in FIG. 3, first network device 120 may communicate with a number of associated network devices 122. Each of network devices 122 may comprise any device for communicating via network packets, including a personal computer, a personal digital assistant, a cellular telephone, or the like. Similarly, second network device 130 may communicate with a number of associated devices 132. One of devices 122 may thereby transmit a stream of network packets to one of devices 132. For example, the transmitted network packets may be Multi-Protocol Label Switch (MPLS) over Ethernet packets, MPLS over PPP packets, MPLS over Asynchronous Transfer Mode (ATM) packets, IP over Ethernet packets, IP over PPP packets, or IP over ATM packets. The network packets may be encapsulated and transmitted according to any network protocol according to some embodiments.

Figure 4:
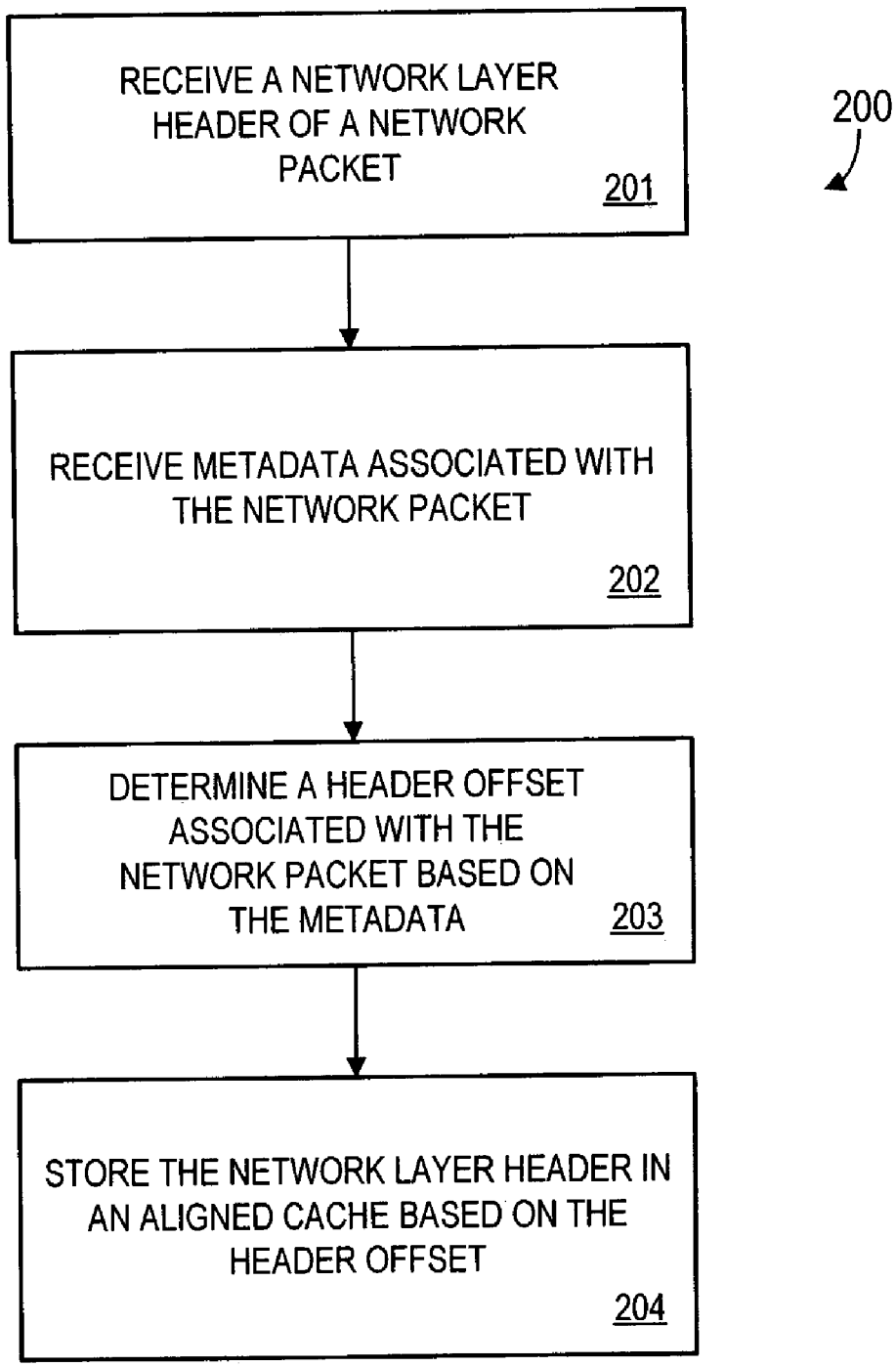
FIG. 4 is a flow diagram of process steps according to some embodiments.

FIG. 4 is a flow diagram of process steps 200 that may be executed by network device 120 after transmission of the network packets. Initially, in step 201, a network layer header of a network packet is received. The network layer header may comprise any ISO OSI layer 3 header, including but not limited to an IPv4 header, an IPv6 header, and an MPLS shim header. Also received in step 201 may be other layer headers and data of the network packet.

Metadata associated with the network packet is then received in step 202. The metadata may be received from a memory that is different from the memory from which the network layer header was received. The metadata includes packet control information. This information may comprise one or more of packet buffer size, packet buffer offset, packet size, input port from where the packet was received, output port from which the packet should be transmitted, header type, flow id, class id, and any other information.

Next, in step 203, a header offset associated with the network packet is determined based on the metadata. The header offset indicates a distance from a beginning of the network layer header to a quad word boundary. The header offset is then used in step 204 to store the network layer header in an aligned cache. Some embodiments of process steps 200 provide faster and more efficient processing of network layer headers than currently available. Process steps 200 will be described in greater detail below with respect to FIGS. 7a and 7b.

Figure 5:
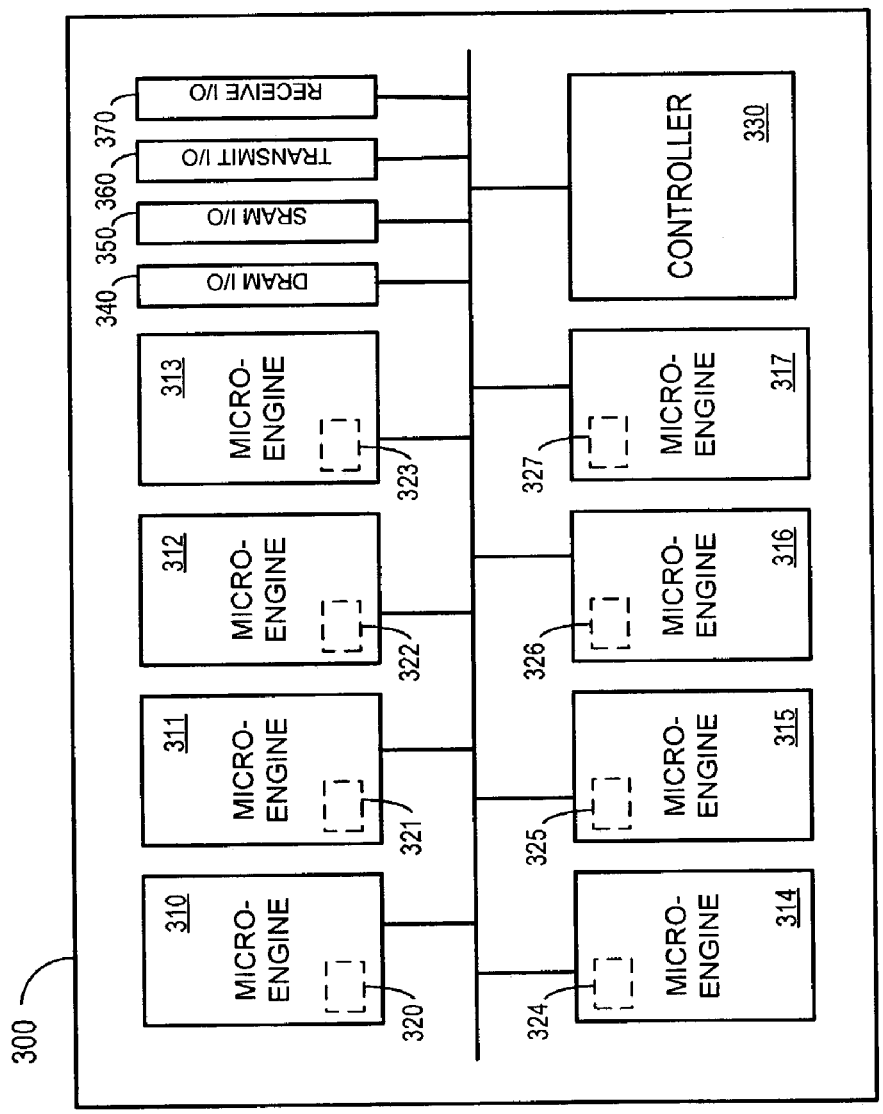
FIG. 5 is a block diagram of a network processor according to some embodiments.

FIG. 5 is a block diagram of network processor 300 that may be used in conjunction with some embodiments. Network processor 300 may comprise the aforementioned IXP2400 Network Processor and may therefore be an element of network device 120. Network processor 300 includes microengines 310 through 317, each of which is associated with a respective one of local memories 320 through 327. Each of microengines 310 through 317 comprises a multi-threaded Reduced Instruction Set Computing (RISC) processor for processing network packets independently from one another.

Each of microengines 310 through 317 contains a respective one of local memories 320 through 327. Local memories 320 through 327 each comprises 4 Kb of memory for storing 640 long words (32 bits) of data. Local memories 320 through 327 may store microcode that includes function calls that are executable by a respective microengine. A group of function calls used to perform particular packet processing is a microblock. The packet processing may include any type of processing, such as IPv4 forwarding, MPLS forwarding, and packet classification.

Network processor 300 also includes Controller 330. Controller 330 may comprise, for example, a control plane processor (e.g., an Intel® XScale™ processor) that performs control and system management functions and executes real-time applications. DRAM I/O 340 receives and transmits information including network packets from and to a remote DRAM, and SRAM I/O 350 performs similar functions with respect to a remote SRAM. PCI I/O 360 is used to communicate with a host processor over a standard PCI interface.

Figure 6:
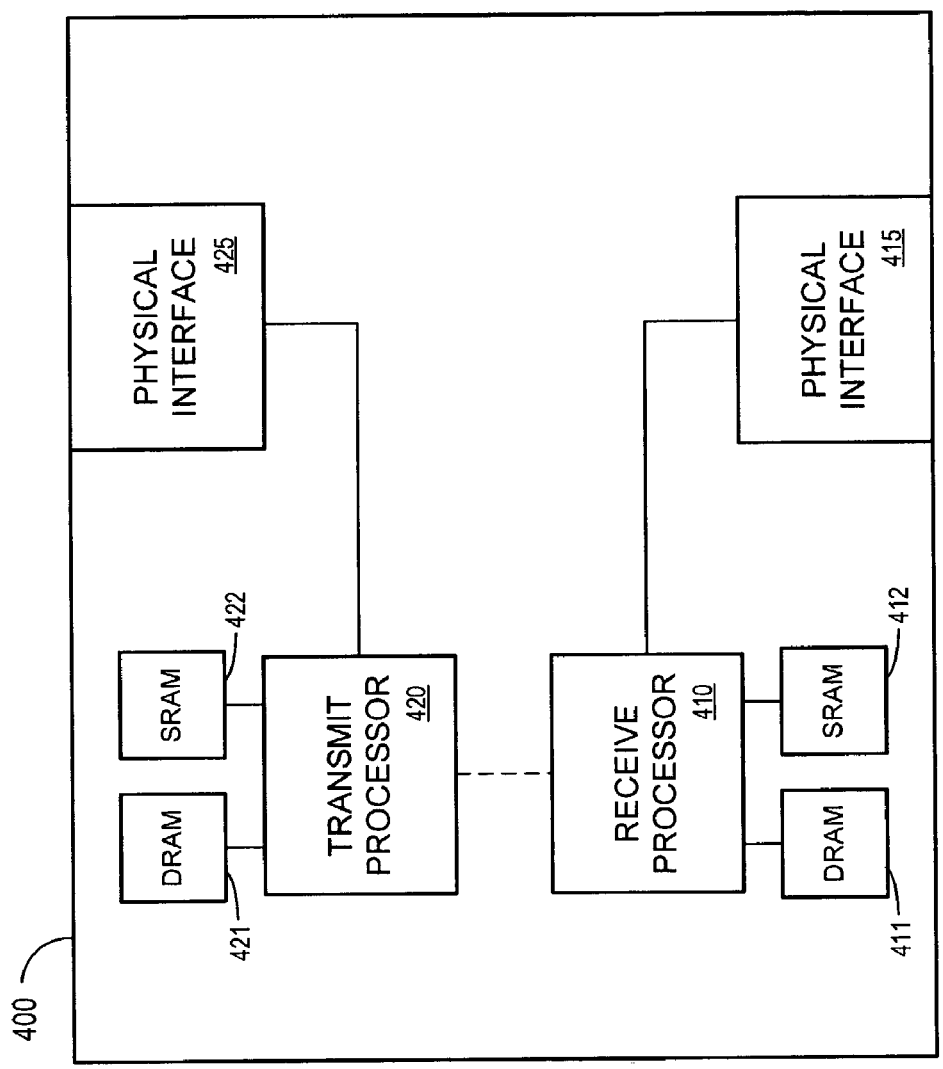
FIG. 6 is a block diagram of a network board according to some embodiments.

FIG. 6 is a block diagram of a network board according to some embodiments. Network board 400 may be an element of network device 120 of FIG. 1. Network board 400 includes transmit processor 410 and receive processor 420. One or both of transmit processor 410 and receive processor 420 may be implemented by network processor 300 of FIG. 5.

Receive processor 410 communicates with physical interface 411 via receive I/O 370 in order to receive network packets from a remote network device. Receive processor 410 may process the packets using DRAM 412 and SRAM 413. Similarly, transmit processor 420 may transmit network packets to a remote network device using physical interface 421, which is coupled to transmit I/O 360. Prior to transmission, the packets may be processed using DRAM 422 and SRAM 423.

Figure 7A:
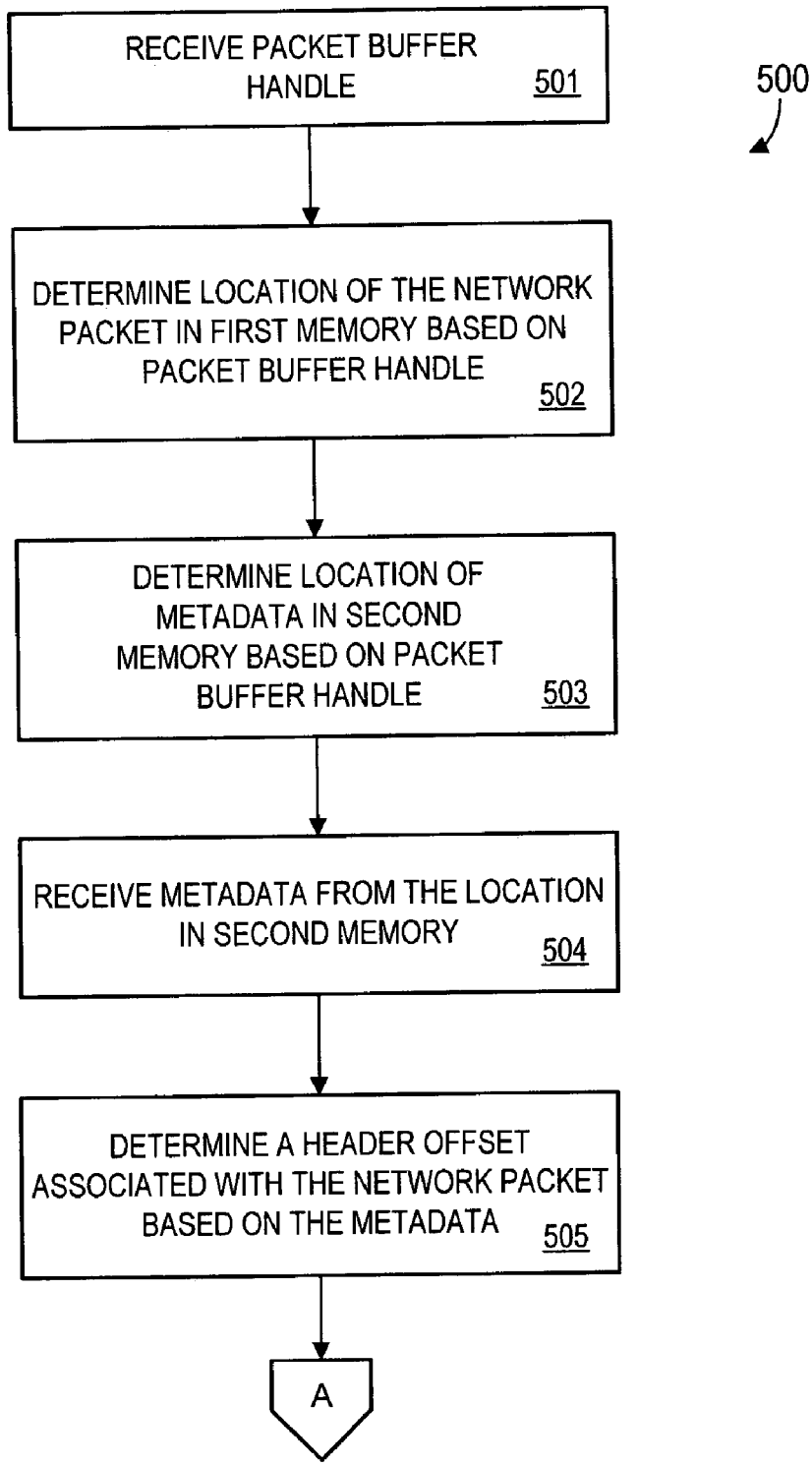
FIGS. 7a and 7b comprise a flow diagram of process steps according to some embodiments.
Figure 7B:
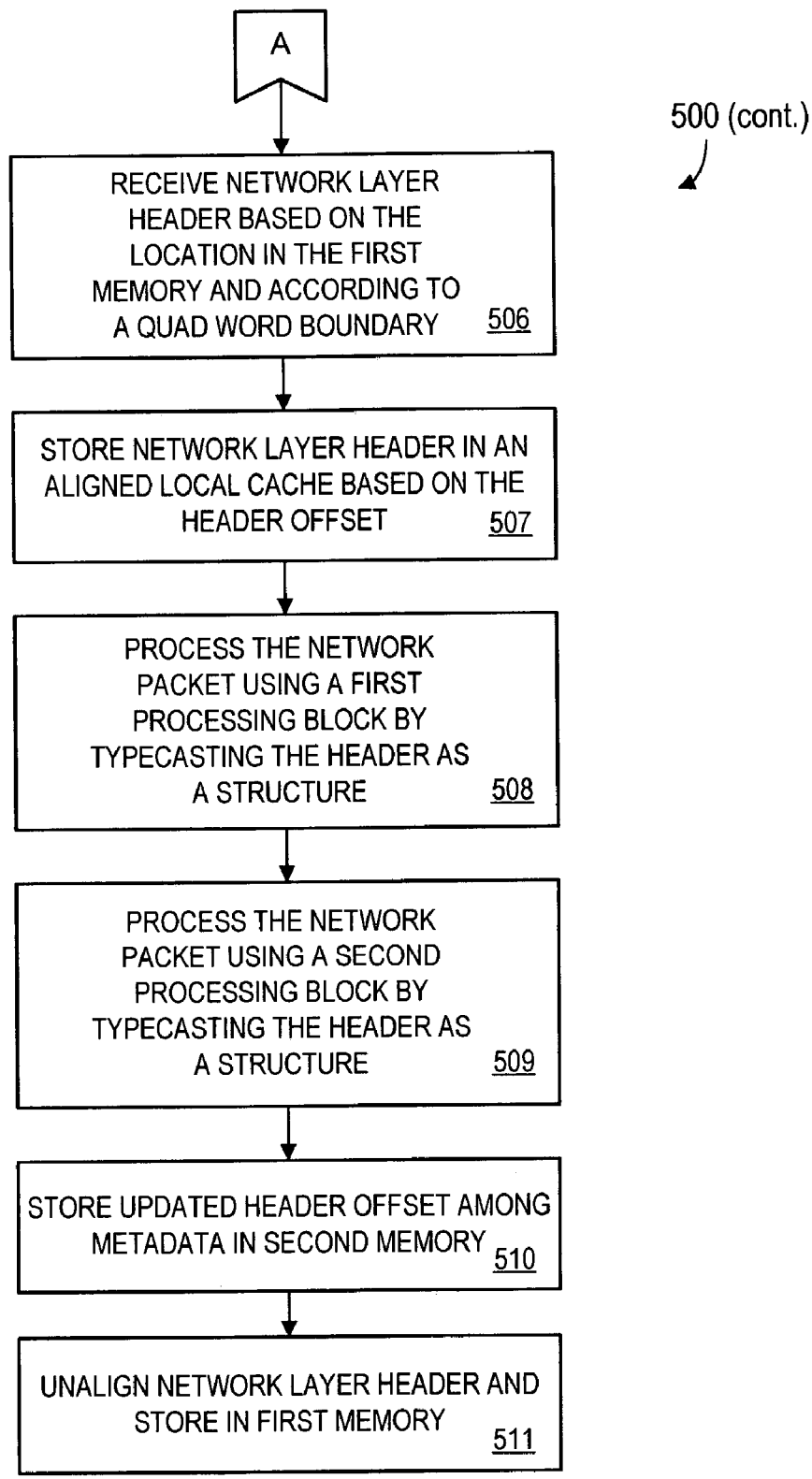

FIGS. 7a and 7b comprise a flow diagram of process steps according to some embodiments. Process steps 500 may be embodied in a microblock stored in one of local memories 320 through 327, and/or may be read from one or more of a computer-readable medium, such as a floppy disk, a CD-ROM, a DVD-ROM, a Zip™ disk, a magnetic tape, or a signal encoding the process steps and stored in a memory in communication with a processor such as one of microengines 310 through 317.

The process steps may be stored in a compressed, uncompiled and/or encrypted format. In some embodiments, hard-wired circuitry may be used in place of, or in combination with, processor-executable process steps for implementation of processes according to some embodiments. Moreover, although process steps 700 are described below with respect to network processor 300, some embodiments may be implemented by devices other than or in addition to those shown in FIGS. 5 and 6.

Prior to step 501, receive processor 410 receives a network packet via physical interface 415. The physical layer over which the network packet is received may be any type of physical layer that is compatible with physical interface 415. Assuming that receive processor 410 is implemented by network processor 300, the network packet is initially received and processed by microengine 310.

Microengine 310 executes a data link layer receiver microblock in order to receive the network packet. More specifically, threads of microengine 310 execute process steps of the microblock for receiving network packets from various types of data link layers such as ATM, PPP and Ethernet. A received "IP over Ethernet" network packet is stored in DRAM 411 as shown in FIG. 2.

A packet buffer base address and a packet buffer offset are determined upon storing the network packet in DRAM 411. It will be assumed that the packet buffer base address for the FIG. 2 network packet is 0x1F80. Accordingly, the packet buffer offset of the network packet is determined to be 0x80 (0x1F80+0x80=0x2000). The packet buffer base address and the packet buffer offset are stored in SRAM 412, along with other metadata descriptive of the packet.

Microengine 310 further executes the data link layer receiver microblock to decapsulate the network packet. Decapsulation comprises determining a starting address of the network layer header of the network packet. The starting address is determined in terms of an offset from the packet buffer base address. As shown in FIG. 2, the network layer header begins at address 0x200E. Consequently, the network layer header offset is 0x8E(0x1F80+0x8E=0x200E). The network layer header offset is then stored among the associated metadata in SRAM 412. In some embodiments, the network layer header offset replaces the packet buffer offset that was previously stored in SRAM 412.

Next, a packet buffer handle that identifies both the location of the network packet in DRAM 411 and the location of the associated metadata in SRAM 412 is created using known protocols. The packet buffer handle is transmitted to a scratch ring, which is a construct used to pass information between microengines.

Figure 8:
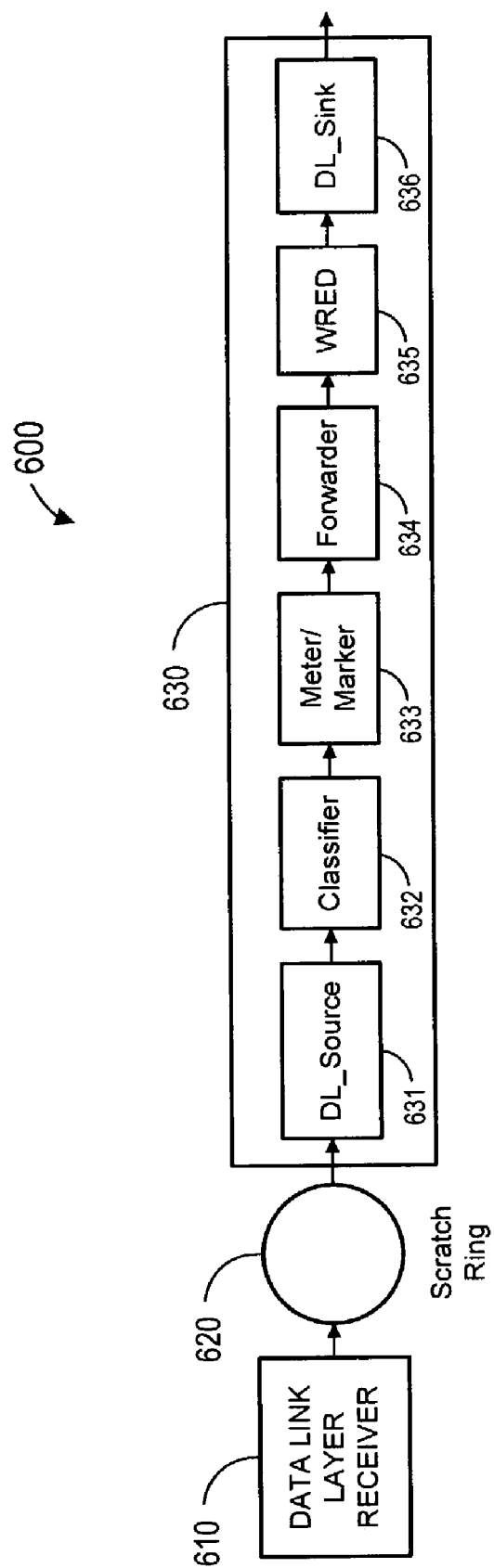
FIG. 8 is a functional block diagram of a processing pipeline according to some embodiments.

FIG. 8 illustrates functional processing pipeline 600. Functional pipeline 600 includes data link receiver block 610, scratch ring 620 and network layer processing blocks 630. Network layer processing blocks 630 comprise microblocks that are executed by a second microengine, the second microengine being different from the microengine which executes data link receiver block 610. The present example will assume that the second microengine is microengine 311.

The created packet buffer handle may be passed from data link receiver block 610 to network layer processing blocks 630 via scratch ring 620.

The packet buffer handle is received from scratch ring 620 by network layer processing blocks 630 in step 501. Next, in step 502, microengine 311 executes process steps of DispatchLoop_Source block 631 to determine the location of the network packet in DRAM 411 based on the packet buffer handle and in accordance with the above-mentioned known protocols. Also in accordance with the protocols, the location of metadata associated with the network packet in SRAM 412 is determined in step 503.

The metadata is received from the determined location of SRAM 412 in step 504. The metadata may be stored in local memory 321 and/or in general-purpose registers of microengine 311. As described above, the metadata includes a network layer header offset associated with the subject network packet. The network layer header offset is therefore determined from the metadata in step 505. In the present example, the determined network layer header offset is 0x8E.

The network layer header is received from DRAM 411 in step 506. According to some embodiments, also received in step 506 are a portion of the data of the network packet and a portion of the data link layer header of the network packet. The following array may be declared in local memory 321 to store the information from DRAM 411.

```
#define MAX_HDR_SIZE           12
#define GENERIC_HEADER_OFFSET  4
-declspec (local_mem) unsigned int generic_hdr [MAX_HDR_SIZE]
```

Generally, a first four long words of the array may be used by microblocks 632 through 635 to append other header information such as MPLS labels and a remaining eight long words of the array are used for an aligned cache storing an aligned network layer header at offset GENERIC_HDR_OFFSET.

In step 506, a decapsulated address of the network packet in DRAM is determined based on the location determined in step 502 and the network layer header offset determined in step 505. According to the present example, the decapsulated address is 0x200E (0x1F80+0x8E). Since DRAM 411 is accessed on a quad word boundary, a lower three bits of this address are ignored in step 506 and the network packet is read from DRAM address 0x2008.

The network packet is stored in a read transfer register associated with microengine 311 prior to being stored in the declared array of local memory 321. The contents of the transfer register prior to storage in local memory 321 are as follows:

| | | | | |
|---|---|---|---|---|
| $$xfer0 = | ETH | ETH | ETH | ETH |
| $$xfer1 = | ETH | ETH | IP | IP |
| $$xfer2 = | IP | IP | IP | IP |
| $$xfer3 = | IP | IP | IP | IP |
| $$xfer4 = | IP | IP | IP | IP |
| $$xfer5 = | IP | IP | IP | IP |
| $$xfer6 = | IP | IP | Dat | Dat |
| $$xfer7 = | Dat | Dat | Dat | Dat |

As shown, the network layer header remains unaligned even within the transfer register. DispatchLoop_Source block 631 therefore includes process steps of an align_pkt_hdr( ) function which may be used in step 507 to store the network layer header in an aligned cache of local memory 321. The align_pkt_hdr( ) function uses the previously determined network layer header offset to perform such storage. Code for the align_pkt_hdr( ) function according to some embodiments is as follows:

```
Void align_hdr (unsigned int offset)
{
    dl_hdr_off=GENERIC_HDR_OFFSET;
    switch(offset % 7)
    {
    case 0:
        -------
        break
    case 1:
        -------
        break
    case 2: //PPP
        generic_hdr[dl_hdr_off+0]=((p_hdr_in[0]<<16) | (p_hdr_in[1]>>16));
        generic_hdr[dl_hdr_off+1]=((p_hdr_in[1]<<16) | (p_hdr_in[2]>>16));
        generic_hdr[dl_hdr_off+2]=((p_hdr_in[2]<<16) | (p_hdr_in[3]>>16));
        generic_hdr[dl_hdr_off+3]=((p_hdr_in[3]<<16) | (p_hdr_in[4]>>16));
        generic_hdr[dl_hdr_off+4]=((p_hdr_in[4]<<16) | (p_hdr_in[5]>>16));
        generic_hdr[dl_hdr_off+5]=((p_hdr_in[5]<<16) | (p_hdr_in[6]>>16));
        generic_hdr[dl_hdr_off+6]=((p_hdr_in[6]<<16) | (p_hdr_in[7]>>16));
        generic_hdr[dl_hdr_off+7]=(p_hdr_in[7]<<16);
        break;
    //other cases
    case 6: //Ethernet
        generic_hdr[dl_hdr_off+0]=((p_hdr_in[1]<<16) | (p_hdr_in[2]>>16));
        generic_hdr[dl_hdr_off+1]=((p_hdr_in[2]<<16) | (p_hdr_in[3]>>16));
        generic_hdr[dl_hdr_off+2]=((p_hdr_in[3]<<16) | (p_hdr_in[4]>>16));
        generic_hdr[dl_hdr_off+3]=((p_hdr_in[4]<<16) | (p_hdr_in[5]>>16));
```

```
        generic_hdr[dl_hdr_off+4]=((p_hdr_in[5]<<16) | (p_hdr_in[6]>>16));
        generic_hdr[dl_hdr_off+5]=((p_hdr_in[6]<<16) | (p_hdr_in[7]>>16));
        generic_hdr[dl_hdr_off+6]=(p_hdr_in[7]<<16);
        break;
    case 7: -------
        break;
    }
}
```

After microengine 311 executes the align_pkt_hdr ( ) function in step 507, contents of local memory 321 may be as follows:

```
generic_hdr [GENERIC_HEADER_OFFSET − 4] = --
generic_hdr [GENERIC_HEADER_OFFSET − 3] = --
generic_hdr [GENERIC_HEADER_OFFSET − 2] = --
generic_hdr [GENERIC_HEADER_OFFSET − 1] = --
generic_hdr [GENERIC_HEADER_OFFSET]     = IP IP IP IP
generic_hdr [GENERIC_HEADER_OFFSET + 1] = IP IP IP IP
generic_hdr [GENERIC_HEADER_OFFSET + 2] = IP IP IP IP
generic_hdr [GENERIC_HEADER_OFFSET + 3] = IP IP IP IP
generic_hdr [GENERIC_HEADER_OFFSET + 4] = IP IP IP IP
generic_hdr [GENERIC_HEADER_OFFSET + 5] = Dat Dat Dat Dat
generic_hdr [GENERIC_HEADER_OFFSET + 6] = Dat Dat -- --
generic_hdr [GENERIC_HEADER_OFFSET + 7] = -- -- -- --
```

After the network layer header is stored in step 507, microengine 311 may sequentially execute microblocks 632 through 635 to process the network packet. This processing may require access to the network layer header, in which case the network layer header may be accessed from the aligned local cache rather than from DRAM 411, in which the network layer header is also stored.

More particularly, the network packet may be processed in step 508 using a first one of microblocks 632 through 635. It will be assumed that the processing requires information contained in the associated network layer header. Since the network layer header is stored in the aligned cache, the first microblock may simply typecast the network layer header as a structure in order to access the information contained therein. One typecast suitable for some embodiments is as follows:

```
    __declspec(packed) typedef struct
    {
        unsigned int ver:4,
                hdr_len:4,
                tos_dscp:6,
                tos_cu:2,
                total_len:16,
        unsigned int identification:16,
                flag_fragoffset:16,
        unsigned int ttl:8,
                protocol:8,
                hdr_checksum:16,
        unsigned int src_addr;
        unsigned int dest_addr;
        unsigned int src_dest_port;
    } ip_tcphdr;
    __declspec(local_mem) ip-tcphdr * declspec(gp_reg) cache_ptr;
    cache_ptr = __(declspec(local_mem) ip_tcphdr *)&generic_hdr
        [GENERIC_HDR_OFFSET]
```

Next, in step 509, the network packet may be processed using a second one of microblocks 632 through 635 that also typecasts the network layer header as a structure. A typecast such as that shown above may be used by the second processing block.

Each of the first and second processing blocks may determine an updated header offset based on processing performed thereby. The updated offset is stored among the associated metadata of SRAM 412 in step 510. The network layer header is then unaligned and written back to DRAM 411 in step 511 at a proper packet offset that accounts for the increased length of the network layer header.

The following code may be used by the DispatchLoop_Sink block 636 to perform steps 510 and 511 of process steps 500:

```
Void unalign_hdr(_declspec(dram_write_reg)
unsigned int *p_hdr_out)
{
_declspec(gpreg) unsigned int offset;
index = dl_hdr_offset;
    switch (meta_data_lm.dl.offset & 0x7)
    {
    case 0:
        -------
        break
    case 1:
        -------
        break
    case 2: //alignment in DRAM
        * (p_hdr_out+0)=(generic_hdr[index]<<16);
        * (p_hdr_out+1)=(generic_hdr[index+0]<<16) |
            (generic_hdr[index+1]>>16));
        * (p_hdr_out+2)=(generic_hdr[index+1]<<16) |
            (generic_hdr[index+2]>>16));
        * (p_hdr_out+3)=(generic_hdr[index+2]<<16) |
            (generic_hdr[index+3]>>16));
        * (p_hdr_out+4)=(generic_hdr[index+3]<<16) |
            (generic_hdr[index+4]>>16));
        * (p_hdr_out+5)=(generic_hdr[index+4]<<16) |
            (generic_hdr[index+5]>>16));
        * (p_hdr_out+6)=(generic_hdr[index+5]<<16) |
            (generic_hdr[index+6]>>16));
        * (p_hdr_out+7)=(generic_hdr[index+6]<<16) |
            (generic_hdr[index+7]>>16));
        break ;
    //other cases
```

-continued

```
        case 6: //alignment in DRAM
            * (p_hdr_out+0]= 0;
            * (p_hdr_out+1]=(generic_hdr[index+0]<<16);
            * (p_hdr_out+2]=(generic_hdr[index+0]<<16) |
            (generic_hdr[index+1]>>16));
            * (p_hdr_out+3]=(generic_hdr[index+1]<<16) |
            (generic_hdr[index+2]>>16));
            * (p_hdr_out+4]=(generic_hdr[index+2]<<16) |
            (generic_hdr[index+3]>>16));
            * (p_hdr_out+5]=(generic_hdr[index+3]<<16) |
            (generic_hdr[index+4]>>16));
            * (p_hdr_out+6]=(generic_hdr[index+4]<<16) |
            (generic_hdr[index+5]>>16));
            * (p_hdr_out+7]=(generic_hdr[index+5]<<16) |
            (generic_hdr[index+6]>>16));
            break ;
        case 7: -------
                break ;
        }
    }
```

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. A method comprising:
receiving a network layer header of a network packet;
receiving metadata associated with the network packet;
determining a header offset associated with the network packet based on the metadata; and
storing the network layer header in an aligned cache based on the header offset;
wherein the step of receiving the network layer header comprises:
acquiring the network layer header from a first memory based on a location of the network layer header in the memory and according to a quad word boundary of the memory.

2. A computer-readable medium storing processor-executable process steps, the process steps comprising:
a step to receive a network layer header of a network packet;
a step to receive metadata associated with the network packet;
a step to determine a header offset associated with the network packet based on the metadata; and
a step to store the network layer header in an aligned cache based on the header offset;
the process steps further comprising:
wherein the step to receive the network layer header comprises:
a step to acquire the network layer header from a first memory based on a location of the network layer header in the memory and according to a quad word boundary of the memory.

3. A device comprising:
a memory storing processor-executable process steps; and
a processor in communication with the memory and operative in conjunction with the stored process steps to:
receive a network layer header of a network packet;
receive metadata associated with the network packet;
determine a header offset associated with the network packet based on the metadata; and
store the network layer header in an aligned cache based on the header offser;
wherein the step to receive the network layer header comprises:
a step to acquire the network layer header from a first memory based on a location of the network layer header in the memory and according to a quad word boundary of the memory.

4. A system comprising:
a plurality of network devices; and
a switch to receive network packets from one or more of the plurality of network devices, wherein the switch comprises:
a memory storing processor-executable process steps; and
a processor in communication with the memory and operative in conjunction with the stored process steps to:
receive a network layer header of a network packet;
receive metadata associated with the network packet;
determine a header offset associated with the network packet based on the metadata; and
store the network layer header in an aligned cache based on the header offset;
wherein the step to receive the network layer header comprises:
a step to acquire the network layer header from a first memory based on a location of the network layer header in the memory and according to a quad word boundary of the memory.

* * * * *